US011649932B2

(12) United States Patent
Deparis et al.

(10) Patent No.: US 11,649,932 B2
(45) Date of Patent: May 16, 2023

(54) COMPRESSED GAS DISCHARGE DEVICE

(71) Applicant: Plastic Omnium New Energies France, Lyons (FR)

(72) Inventors: Eric Deparis, Brussels (BE); Aurelien Daragon, Brussels (BE)

(73) Assignee: Plastic Omnium New Energies France, Lyons (FR)

( * ) Notice: Subject to any disclaimer, the term of this patent is extended or adjusted under 35 U.S.C. 154(b) by 0 days.

(21) Appl. No.: 17/630,780

(22) PCT Filed: Jul. 28, 2020

(86) PCT No.: PCT/EP2020/071275
§ 371 (c)(1),
(2) Date: Jan. 27, 2022

(87) PCT Pub. No.: WO2021/018890
PCT Pub. Date: Feb. 4, 2021

(65) Prior Publication Data
US 2022/0268403 A1    Aug. 25, 2022

(30) Foreign Application Priority Data

Jul. 31, 2019  (FR) ...................... 19 08771

(51) Int. Cl.
*F17C 7/00* (2006.01)
*F17C 1/00* (2006.01)
(Continued)

(52) U.S. Cl.
CPC ............ *F17C 13/04* (2013.01); *F17C 13/084* (2013.01); *F17C 7/00* (2013.01);
(Continued)

(58) Field of Classification Search
CPC ................... F17C 13/04; F17C 13/084; F17C 2205/0142; F17C 2205/0352;
(Continued)

(56) References Cited

U.S. PATENT DOCUMENTS 2,011,347 A * 8/1935 Ragonnet ................ B60P 3/222
222/3
2,242,291 A * 5/1941 Deming .................. F17C 13/04
285/332
(Continued)

FOREIGN PATENT DOCUMENTS

AU           633945      2/1991
CN      105257940 A *   1/2016
(Continued)

OTHER PUBLICATIONS

CN-105257940-A English Translation of Specification (Year: 2022).*
(Continued)

*Primary Examiner* — Timothy P. Kelly
*Assistant Examiner* — Stephanie A Shrieves
(74) *Attorney, Agent, or Firm* — Oblon, McClelland, Maier & Neustadt, L.L.P.

(57) ABSTRACT

A gas discharge device, for a vehicle powered by compressed gas, includes: a gas manifold having a hollow body and including at least one port configured to be in fluid communication with a compressed gas tank, and an opening for discharging gas into the atmosphere; and a pipe configured to connect the port to the compressed gas tank. The pipe is freely translatable in the port to enable a first end of the pipe to move translationally along an axis in the port.

14 Claims, 3 Drawing Sheets

(51) Int. Cl.
*F17C 13/04* (2006.01)
*F17C 13/08* (2006.01)

(52) U.S. Cl.
CPC ............ *F17C 2205/0142* (2013.01); *F17C 2205/0352* (2013.01); *F17C 2221/012* (2013.01); *F17C 2223/036* (2013.01); *F17C 2225/0123* (2013.01)

(58) Field of Classification Search
CPC .......... F17C 2221/012; F17C 2223/036; F17C 2225/0123
USPC ........................................................ 222/30
See application file for complete search history.

(56) References Cited

U.S. PATENT DOCUMENTS

| | | | | |
|---|---|---|---|---|
| 3,319,433 | A * | 5/1967 | Pauliukonis | F17C 3/08 |
| | | | | 220/564 |
| 4,542,774 | A * | 9/1985 | Stavlo | F17C 13/085 |
| | | | | 141/237 |
| 5,042,520 | A | 8/1991 | Reznik | |
| 6,206,027 | B1 * | 3/2001 | Ponnet | F17C 1/00 |
| | | | | 137/256 |
| 6,240,909 | B1 * | 6/2001 | Scott | F17C 13/04 |
| | | | | 123/527 |
| 6,393,846 | B1 | 5/2002 | Frye | |
| 6,786,229 | B1 | 9/2004 | Friedlmeier et al. | |
| 7,137,474 | B2 * | 11/2006 | Yokote | F17C 13/084 |
| | | | | 248/500 |
| 2004/0159352 | A1 | 8/2004 | Friedlmeier et al. | |
| 2013/0269814 | A1 | 10/2013 | Mayr et al. | |
| 2014/0061266 | A1 | 3/2014 | Milton et al. | |
| 2014/0290797 | A1 * | 10/2014 | Kriese | F17C 1/00 |
| | | | | 141/237 |
| 2016/0368372 | A1 * | 12/2016 | Milton | F17C 1/005 |
| 2019/0047404 | A1 * | 2/2019 | Sawai | B60K 15/07 |

FOREIGN PATENT DOCUMENTS

| | | | | |
|---|---|---|---|---|
| CN | 105257940 A | 1/2016 | | |
| CN | 205618979 U | 10/2016 | | |
| CN | 208935812 U | 6/2019 | | |
| DE | 102016214509 A1 * | 2/2018 | ....... | B60K 15/03006 |
| EP | 1 239 908 A2 | 9/2002 | | |
| EP | 2 650 586 A1 | 10/2013 | | |
| FR | 2 905 446 A1 | 3/2008 | | |
| JP | 2006-97754 A | 4/2006 | | |
| JP | 2012-17850 A | 1/2012 | | |
| JP | 2012-92920 A | 5/2012 | | |
| JP | 2016-85835 A | 5/2016 | | |
| JP | 6194519 B2 | 9/2017 | | |
| JP | 2019-32055 A | 2/2019 | | |
| JP | 2019-35442 A | 3/2019 | | |
| WO | WO 2014/016553 A1 | 1/2014 | | |

OTHER PUBLICATIONS

DE-102016214509-A1 English Translation of Specification (Year: 2022).*
International Search Report dated Oct. 1, 2020 in PCT/EP2020/071275 filed on Jul. 28, 2020 (2 pages).
Korean Office Action dated Jun. 2, 2022 in Korean Patent Application No. 10-2022-7004972 (with English translation), 10 pages.
Japanese Office Action dated Jul. 4, 2022 in Japanese Patent Application No. 2022-505613 (with English translation), 8 pages.

* cited by examiner

Fig. 1
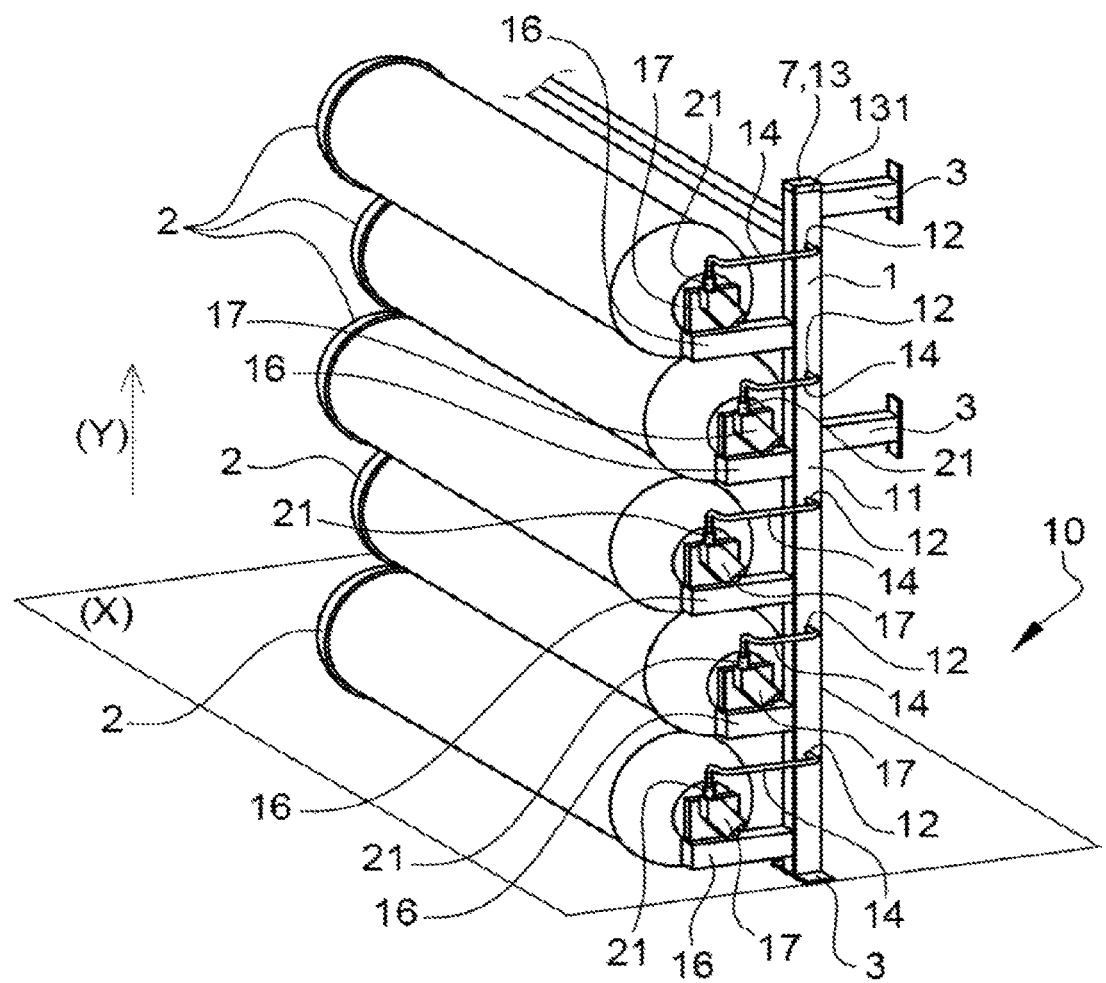
Fig. 2
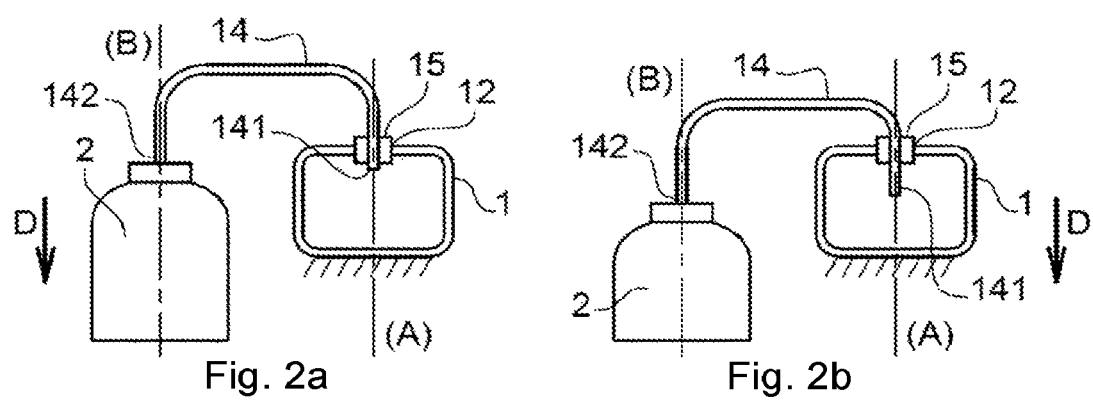
Fig. 2a　　　　Fig. 2b

Fig. 3
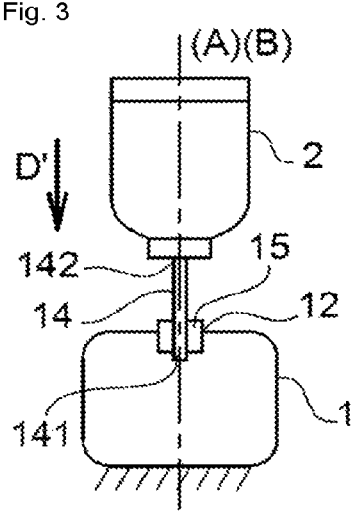
Fig. 3a
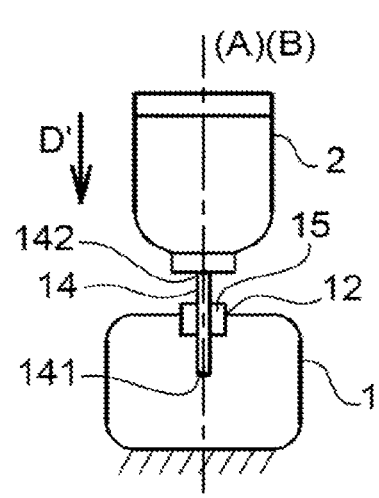
Fig. 3b
Fig. 4
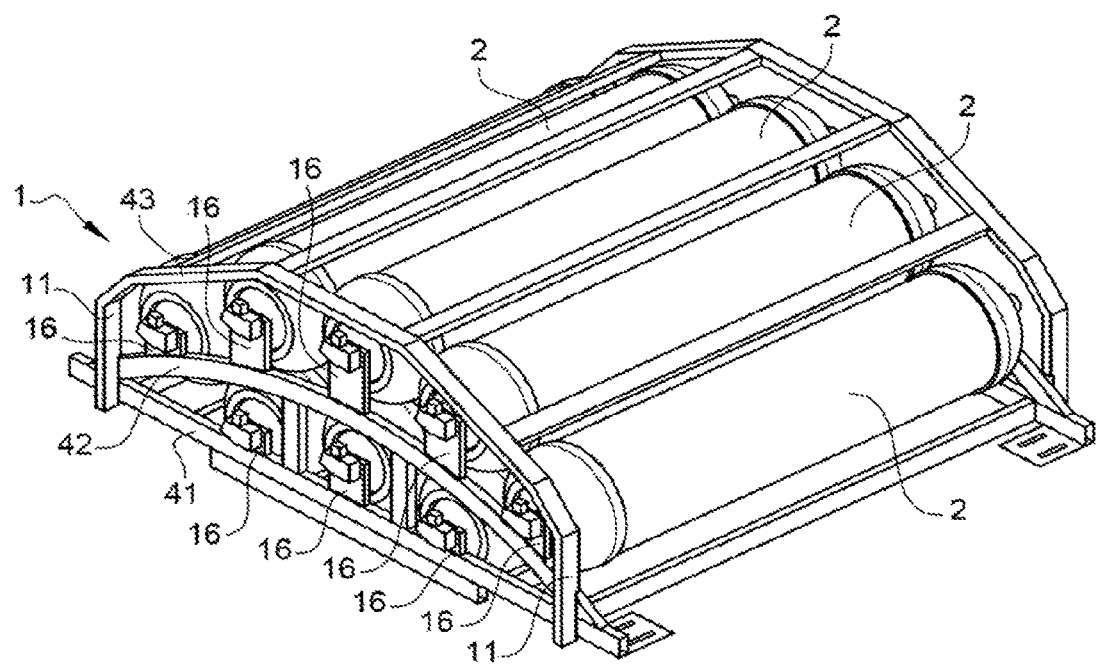

Fig. 5
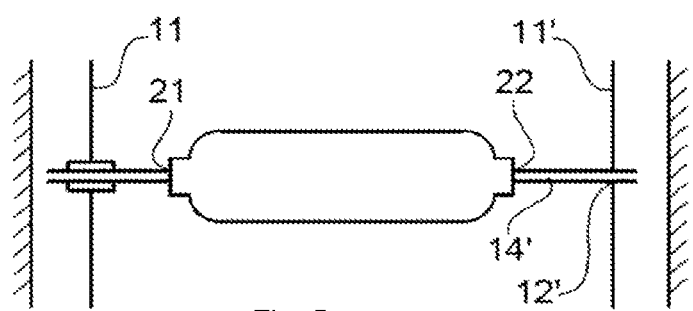
Fig. 5a
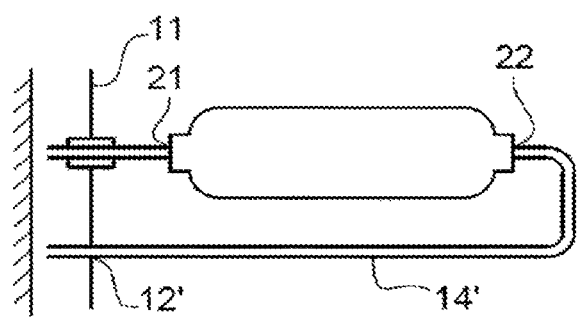
Fig. 5b

COMPRESSED GAS DISCHARGE DEVICE

BACKGROUND OF THE INVENTION

Field of the Invention

The invention relates to the field of gas-powered vehicles, such as cars, trucks, trains or even boats. The invention relates more particularly to a device for discharging compressed gas. The invention also relates to a system comprising gas tanks and to such a device for discharging compressed gas.

Description of the Related Art

It is necessary to store and transport compressed gases in a gas powered vehicle. To do this, gas tanks are provided to contain a gas, for example compressed natural gas (CNG) or hydrogen, the pressure of which is greater than atmospheric pressure. Most gas tanks are cylindrical in shape and comprise a gas discharge opening at one end. A pressure regulator can be connected to the discharge opening for controlled gas discharge when necessary, for example when the tank reaches an excessive temperature.

A compressed gas tank system is already known in the state of the art, in particular from document U.S. Pat. No. 6,786,229. The tanks as described in this document each comprise an end provided with an opening connected to a connecting rail. The openings are in communication with a gas passage arranged in the connecting rail in order to allow gas to be discharged via this passage to the atmosphere. The tanks are fixedly mounted on the connecting rail.

The solution proposed in the state of the art has the drawback of not being suitable for use in a vehicle requiring larger gas tanks. Indeed, it is known that the external dimensions of a composite pressurized tank, for example of type IV, vary according to the filling rate of the tank. Thus, the volume of a full tank is different from that of an empty tank. For example, the dimensions of a composite tank compressed to 350 bar (35 MPa) increase by 1% compared to the empty tank. This size variation must be taken into account in the case of a large tank. For example, for a tank intended for use in a truck-type vehicle with a hydrogen storage volume of 200 l, a length of 2 m and a diameter of approximately 415 mm, an increase of 1% corresponds to 2 cm of elongation of the tank along its longitudinal axis. This increase in the size of the tank creates additional pressure on the tank support means, in this case the connecting rail in the state of the art, and may deform them or even damage them. This pressure can also be exerted on a part of the tank, in particular at the gas discharge opening, and compromise the tightness of the system.

BRIEF SUMMARY OF THE INVENTION

The object of the invention is in particular to provide a compressed gas discharge system for any type of gas-powered vehicle that is more robust and has improved tightness.

To this end, the invention relates to a gas discharge device for a vehicle powered by compressed gas, comprising:
  a gas manifold having a hollow body and comprising:
    at least one port configured to be in fluid communication with a compressed gas tank; and
    an opening for discharging gas into the atmosphere;
  a pipe configured to connect the port to a compressed gas tank;
  the pipe being freely translatable in the port to enable a first end of the pipe to move translationally along an axis (A) in the port.

The translational movement of the pipe makes it possible to compensate for the expansion of the tank, that is to say, the increase in the dimensions of the tank along its longitudinal axis, by a free movement of the first end of the pipe along the axis (A) with the other end held in position. This compensation is essential for a large tank in order to prevent its expansion from causing deformation or even damage to the pipe or the gas manifold. Thus, the solution as proposed by the present invention makes it possible to produce a safe, robust gas discharge device with better tightness, under all circumstances.

According to other optional features of the compressed gas discharge device, taken alone or in combination:
  the amplitude of the translational movement of the pipe in the port is limited by the expansion of the tank alone. This allows the tank to extend freely over its longitudinal axis;
  the hollow body of the gas manifold is a tubular hollow body extending along a longitudinal axis (Y). This allows a series of tanks to be fluidly connected to the gas manifold;
  the hollow body of the gas manifold defines a gas discharge passage to a gas outlet of the manifold. This allows the gas to be discharged through a single gas outlet from the manifold;
  the gas discharge opening to the atmosphere is open to the atmosphere at the gas outlet of the manifold. This allows the gas to be discharged into the atmosphere with a minimal pressure drop;
  the gas discharge opening to the atmosphere opens unobstructed into the atmosphere at the gas outlet of the manifold. An obstruction is typically a device that the discharged gas must pass through before opening into the atmosphere, for example, a valve, a pressure regulator or a pressure reducer;
  the gas outlet of the manifold is located in the axial extension of the tubular hollow body so as to direct the discharged gas away from a substantially horizontal plane (X). This makes it possible to have the shortest possible gas discharge passage to the atmosphere;
  the gas discharge opening to the atmosphere is fitted with a protective cap. This makes it possible, on the one hand, to prevent the entry of fluid into the manifold such as water and rainwater, for example, and, on the other hand, to prevent foreign bodies from entering the manifold such as, insects, rodents, dust, earth, mud, leaves and sand, for example;
  the gas discharge opening to the atmosphere is fitted with a filter so as to prevent foreign bodies from entering the manifold such as insects, rodents, dust, earth, mud, leaves and sand, for example;
  the hollow body of the manifold has a U-shaped bend at the gas outlet of the manifold so as to direct the discharged gas toward the plane (X). This makes it harder for fluids to enter the manifold such as water and rainwater, for example, and foreign bodies such as insects, rodents, dust, earth, etc. mud, leaves and sand, for example;
  the manifold comprises an intermediate element arranged in the port and intended to at least partially receive the first end of the pipe. Preferably, the manifold and the pipe are made of stainless steel. The intermediate element makes it possible to guide the first end of the pipe in its translational movement and to avoid friction between metal parts. The intermediate element can be made of an elastic material that makes it possible to take up the clearances in order to obtain a better seal between the pipe and the manifold. Preferably, the intermediate member is made of an elastomer, for example, EPDM rubber (ethylene-propylene-diene monomer);

the manifold comprises means for supporting a compressed gas tank on the manifold. Therefore, it is possible to perform the gas discharge function and the tank support function with a single element, which allows a reduced manufacturing cost as well as a simplified and lightened device.

The invention also relates to a compressed gas discharge system for a vehicle powered by compressed gas, comprising:

a gas discharge device as described above;

a compressed gas tank having a shape extending along an axis (B) and comprising a first gas outlet;

the pipe comprising a second end connected to the first gas outlet for placing the second end in fluid communication with the first gas outlet.

This makes it possible to create a sliding connection between a compressed gas tank and a gas discharge device.

According to other optional features of the compressed gas discharge system, taken alone or in combination:

the tank extends along the axis (B) between a first end held in an axial position and a second end free in axial translation, the first gas outlet being arranged at the second end of the tank;

the axis (A) is parallel to the axis (B) of the tank and, preferably, coincides with the axis (B) of the tank. The movement of the first end of the pipe is therefore synchronized with that of the tank. The axis (A) can be distinct from the axis (B) in the case where the pipe comprises bent portions. The axis (A) can also coincide with the axis (B) of the tank when the pipe has a rectilinear shape;

the system comprises a relief device arranged at the first gas outlet allowing controlled release of the gas contained in the tank, the second end being connected to the relief device. By way of example, it is conceivable to use a thermal and pressure relief device (TPRD), which is designed to rapidly discharge the entire contents of the tank. Such a device operates in the event of high temperature resulting for example from a fire to avoid weakening of the tank and rupture, which could have catastrophic consequences on equipment and personnel. The discharge flow rate of the gaseous hydrogen associated with the opening of a TPRD device is 70 g/s, which makes it possible to empty a tank of 200 l of hydrogen compressed at 350 bar (35 MPa) in about ten minutes. In the event of a fire, only the tank whose temperature exceeds a certain threshold is emptied by opening the associated TPRD device. Neighboring tanks remain under pressure as long as their TPRD devices are not open;

the tank comprises a second gas outlet arranged opposite the first gas outlet to ensure emptying of the tank in the event that the fire affects only one of the ends of the tank;

the system comprises a second relief device arranged at the second gas outlet allowing controlled release of the gas contained in the tank.

the device comprises:

a second gas manifold having a hollow body and comprising a port configured to be in fluid communication with the second gas outlet and a gas discharge opening to the atmosphere;

a second pipe configured to connect the port to the second gas outlet;

the first and the second manifolds coincide, in which case the gas is discharged only by one side of the device in case of fire. The tank is then supported by a gas manifold on one side and a fixing frame on the other;

the tank is linked in translation with the second manifold, in which case the first and second manifolds are arranged on either side of the tank at its two ends to support the tank. The tank is fixedly mounted on the second manifold for more stability;

the system comprises several tanks arranged in staggered rows. This allows the space occupied by the system in a given direction to be reduced.

BRIEF DESCRIPTION OF THE FIGURES

The invention will be better understood on reading the description which follows, given solely by way of example and with reference to the appended drawings, in which:

FIG. 1 is a perspective view of a compressed gas discharge system according to a first embodiment of the invention;

FIG. 2 is a set of sectional views (FIGS. 2a and 2b) along a plane (X) of the system of FIG. 1, illustrating an arrangement according to a first variant;

FIG. 3 is a set of sectional views (FIGS. 3a and 3b) illustrating an arrangement according to a second variant;

FIG. 4 is a perspective view of a compressed gas discharge system according to a second embodiment of the invention;

FIG. 5 is a set of front views (FIGS. 5a and 5b) illustrating other embodiments of the invention.

DETAILED DESCRIPTION

FIG. 1 shows a compressed gas discharge system according to a first embodiment of the invention, designated by the general reference 10. The system 10 comprises a gas discharge device 1 comprising a gas manifold 11. The manifold 11 according to this embodiment has a tubular hollow body with a longitudinal axis (Y) forming an internal volume for the passage of fluid and defining a gas discharge passage toward a gas outlet 7 of the manifold 11. The manifold 11 comprises fixing means 3 intended to fix the device 1 on a vehicle of the truck type, for example, in a storage housing. The device 1 is installed vertically with respect to a plane (X) visible in FIG. 1 that is a substantially horizontal plane, and the gas outlet 7 of the manifold 11 is located in the axial extension of the tubular hollow body with longitudinal axis (Y) so as to direct the discharged gas away from the plane (X). Alternatively, the hollow body of the manifold 11 has a U-shaped bend (not shown) at the gas outlet 7 of the manifold 11 so as to direct the discharged gas toward the plane (X).

In the example described here, the system 10 comprises a series of tanks 2 of compressed hydrogen, of which there are five. The tanks 2 are arranged vertically and substantially staggered so as to reduce the space occupied. Each tank 2 has a shape extending along an axis (B) and comprises a first gas outlet 21 at the end of the tank 2. The manifold 11 comprises support means 16 in the form of a horizontal bar.

Each horizontal bar 16 makes it possible to receive the end of a tank 2 without immobilizing the latter, for example, by means of a sliding connection.

As illustrated in FIGS. 1 to 3, the manifold 11 comprises ports 12 configured to be in fluid communication with the tanks 2 by means of pipes 14. The manifold 11 further comprises an opening 13 for discharging gas to the atmosphere that is arranged on the top of the manifold 11 and is open to the atmosphere at the gas outlet 7 of the manifold 11. The opening 13 is equipped with a protective cap 131 making it possible to prevent the entry of fluid such as rainwater, for example, and dust in the manifold 11. The protective cap 131 acts as a valve that opens when gas is present in the manifold 11. Advantageously, the valve opens under the effect of the pressure of the discharged gas. As an alternative to the protective cap 131, the opening 13 is equipped with a filter (not shown) so as to prevent foreign bodies from entering the manifold 11.

Each tank 2 comprises, on the first gas outlet 21, an OTV valve ("On-Tank Valve") intended to be placed in fluid communication with a tank filling pipe, a hydrogen supply pipe and a hydrogen discharge pipe. The OTV valve comprises a non-return valve that prevents hydrogen from flowing back up into the tank filling pipe 2 and a shut-off valve to feed a hydrogen consuming device (e.g., a fuel cell) through a holder. The shut-off valve is normally closed. The OTV valve further comprises a thermal and pressure relief device 17 (TPRD), as shown in FIG. 1, which is designed to rapidly discharge the entire contents of the tank. These are the three essential functions to comply with UNECE Regulation No. 134 relative to "Uniform provisions concerning the approval of motor vehicles and their components with regard to the safety-related performance of hydrogen-fueled vehicles."

In order to be in fluid communication with the tanks 2, the manifold 11 comprises pipes 14 each having a first end 141 movably connected to the port 12. The arrangement of the first end 141 relative to the port 12 will be described later. The pipe 14 comprises a second end 142 that is in fluid communication with the first gas outlet 21. Preferably, the second end 142 is fixed to the relief device 17 in a sealed manner. Thus, in the event of high temperature, the relief device discharges the hydrogen contained in the tank 2 in a controlled manner. Through the pipe 14, the hydrogen arrives in the discharge passage defined by the hollow body of the manifold 11 and is discharged to the atmosphere via the discharge opening 13 at the outlet 7 of the manifold 11.

FIGS. 2a and 2b illustrate the arrangement of the first end 141 of the pipe 14 relative to the port 12 of the manifold 11 according to a first variant. This variant corresponds to that implemented in the gas discharge system as illustrated in FIG. 1. In this variant, the manifold 11 comprises an intermediate element 15, for example a circular seal 15 with an axis (A), arranged in the port 12. The tank 2 is installed so that its axis (B) is parallel to the axis (A) and distinct from the axis (A). In order to connect the port 12 and the first gas outlet 21 of the tank 2, the pipe 14 comprises several bent portions so that the first end 141 can slide in the circular seal 15 along the axis (A). Thus, when the dimensions of the tank 2 decrease while the tank 2 is emptying, the pipe 14 moves in a direction D as illustrated in FIGS. 2a and 2b so that the first end 141 penetrates the interior volume of the manifold 11 through a translational movement along the axis (A) in the port 12.

FIGS. 3a and 3b illustrate the arrangement of the first end 141 of the pipe 14 relative to the port 12 of the manifold 11 according to a second variant. In this variant, the tank 2 is installed so that its axis (B) is parallel to the axis (A) and coincides with the axis (A), the first gas outlet 21 being opposite the port 12. In order to connect the port 12 and the first gas outlet 21 of the tank 2, the pipe 14 may comprise several bent portions so that the first end 141 can slide in the circular seal 15 along the axis (A). Preferably and to simplify the system, the pipe 14 may have a rectilinear shape. Thus, when the dimensions of the tank 2 increase while the tank 2 is filling, the pipe 14 moves in a direction D' as illustrated in FIGS. 3a and 3b so that the first end 141 penetrates the interior volume of the manifold 11 through a translational movement along the axis (A) in the port 12.

FIG. 4 illustrates a second embodiment of the invention in which the gas discharge device 1 is configured to be fixed on a vehicle of the train or bus type, for example, in a storage housing. The device 1 comprises a horizontal part 41 configured to receive several tanks 2, for example three as shown in FIG. 4, the horizontal part comprising support means 16 for the tanks 2. The device 1 further comprises an intermediate part 42 in the shape of an arc and configured to receive several other tanks 2, for example five as shown in FIG. 4, the intermediate part comprising support means 16 for the tanks 2. Finally, the device 1 comprises an upper part 43 making it possible to hold the tanks 2 in place.

The device 1 comprises manifolds 11 having a hollow body forming a fluid passage. The manifolds 11 form the vertical parts of the device 1 as illustrated in FIG. 4. In this embodiment, the pipes 14 (not shown) can be connected to the ports 12 (not shown) arranged on the manifolds 11 to put the ports 12 in fluid communication with the tanks 2. It is also possible to provide ports on the horizontal part 41 and/or the intermediate part 42 and/or the upper part 43, in which case these parts 41, 42, 43 are themselves in fluid communication with the manifolds 11. The arrangements of the pipe 14 relative to the port 12 as illustrated in FIGS. 2 and 3 and described above can be implemented in this second embodiment of the invention by a person skilled in the art without particular difficulty.

The invention is not limited to the embodiments presented, and other embodiments will be apparent to those skilled in the art. It is in particular possible for the tanks 2 to comprise a second gas outlet 22 arranged opposite the first gas outlet 21 and for the device 1 to comprise a simplified port 12' configured to be in fluid communication with the second gas outlet 22, support means (not shown) being provided to support the tanks. In this case, the device 1 comprises a second pipe 14' configured to connect the simplified port 12' to the second gas outlet 22 without having to slide in the simplified port 12'. Such a simplified port 12' can be arranged in a single manifold 11 as shown in FIG. 5b or in a separate manifold 11' that would be arranged at the other end of the tank 2 and configured to receive the tank 2 in a fixed manner as visible in FIG. 5a.

It should be noted that the arrangements of the first end 141 of the pipe 14 relative to the port 12, as illustrated in FIGS. 2 and 3 and described above, can also be implemented for the connection between the second end 142 of the pipe 14 and the first gas outlet 21 from the tank 2. It is in particular possible to provide a fluid passage connected to the first gas outlet 21, for example at the relief device 17, configured to receive an intermediate element 15 in which the second end 142 of the pipe 14 would slide, the first end 141 being connected to the port 12 of the manifold 11 in a sealed manner or not.

Although the examples illustrated above refer to hydrogen, the invention is not limited to this gas. Indeed, the invention also applies to other gases stored under pressure such as, for example, natural gas.

The invention claimed is:

1. A compressed gas discharge system for a vehicle powered by compressed gas, comprising:
   a compressed gas tank having a shape extending along an axis and comprising a first gas outlet; and
   a gas discharge device comprising;
   a gas manifold having a hollow body and comprising:
      at least one port configured to be in fluid communication with the compressed gas tank; and
      a gas discharge opening for discharging gas into the atmosphere; and
   a pipe configured to connect the port to the compressed gas tank,
   the pipe being freely translatable in the port to enable a first end of the pipe to move translationally along an axis in the port,
   the pipe comprising a second end connected to the first gas outlet for placing the second end in fluid communication with the first gas outlet,
   wherein the axis of the port is parallel to the axis of the compressed gas tank.

2. The system according to claim 1, wherein the axis is of the port is separate from the axis of the compressed gas tank.

3. The system according to claim 1, comprising a relief device arranged at the first gas outlet allowing controlled release of the gas contained in the compressed gas tank, the second end being connected to the relief device.

4. The system according to claim 1, wherein the compressed gas tank comprises a second gas outlet arranged opposite the first gas outlet.

5. The system according to claim 4, wherein the device comprises:
   a second gas manifold having a hollow body and comprising a port configured to be in fluid communication with the second gas outlet and a gas discharge opening to the atmosphere;
   a second pipe configured to connect the port to the second gas outlet.

6. The system according to claim 5, wherein the gas manifold and the second gas manifold coincide.

7. The system according to claim 5, wherein the compressed gas tank is linked in translation with the second gas manifold.

8. The system according to claim 1, comprising several compressed gas tanks arranged in staggered rows.

9. The system according to claim 1, wherein the axis of the port coincides with the axis of the compressed gas tank.

10. The system according to claim 1, wherein the hollow body of the gas manifold is a tubular hollow body extending along an axis perpendicular to the axis of the port.

11. The system according to claim 1, wherein the hollow body of the gas manifold defines a gas discharge passage to a gas outlet of the gas manifold.

12. The system according to claim 11, wherein the gas discharge opening to the atmosphere is open to the atmosphere at the gas outlet of the gas manifold.

13. The system according to claim 1, wherein the gas manifold comprises an intermediate element arranged in the port and intended to at least partially receive the first end of the pipe.

14. The system according to claim 1, wherein the gas manifold comprises means for supporting a compressed gas tank on the gas manifold.

* * * * *